United States Patent [19]
Wilkinson et al.

[11] Patent Number: 5,789,505
[45] Date of Patent: Aug. 4, 1998

[54] SURFACTANTS FOR USE IN LIQUID/ SUPERCRITICAL $CO_2$

[75] Inventors: Steven Paul Wilkinson, Coopersburg; Frank Kenneth Schweighardt, Allentown; Lloyd Mahlon Robeson, Macungie, all of Pa.

[73] Assignee: Air Products and Chemicals, Inc., Allentown, Pa.

[21] Appl. No.: 911,416

[22] Filed: Aug. 14, 1997

[51] Int. Cl.$^6$ .................. C08F 2/44; D06L 1/00; B05D 1/02
[52] U.S. Cl. .................. 526/209; 8/142; 427/421
[58] Field of Search .................. 526/209; 8/142; 427/421

[56] References Cited

U.S. PATENT DOCUMENTS

| | | | |
|---|---|---|---|
| 4,012,194 | 3/1977 | Maffei | 8/142 |
| 4,806,171 | 2/1989 | Whitlock et al. | 134/7 |
| 4,913,235 | 4/1990 | Harris et al. | 166/273 |
| 5,238,671 | 8/1993 | Matson et al. | 423/397 |
| 5,266,205 | 11/1993 | Fulton et al. | 210/639 |
| 5,306,350 | 4/1994 | Hoy et al. | 134/22.14 |
| 5,312,882 | 5/1994 | DeSimone et al. | 526/201 |
| 5,412,958 | 5/1995 | Iliff et al. | 68/5 |
| 5,679,737 | 10/1997 | DeSimone et al. | 524/529 |

OTHER PUBLICATIONS

DeSimone, J.M. et al. "Dispersion Polymerizations in Supercritical Carbon Dioxide." *Science*. 265 (Jul. 15, 1994) 356–359.

Hoefling, T.A., et al. "Design and Synthesis of Highly $CO_2$–Soluble Surfactants and Chelating Agents." *Fluid Phase Equilibria*. 83 (1993) 203–212. (Month Unknown).

Hoefling, T.A., et al. "Microemulsions in Near–Critical and Supercritical $CO_2$." *J. Phys. Chem.* 95 (1991) 7127–7129. (Month Unknown).

Kosswig, K. et al. "Surfactants." vol. A25 of *Ullman's Encyclopedia of Industrial Chemistry*. Ed. B. Elvers, S. Hawkins, and W. Russey. VCH Verlagsgesellschaft mbH: Weinheim, Germany, 1994. 747–755 (Month Uknow).

Cahn, A. et al. "Surfactants and Detersive Systems." vol. 22 of *Kirk–Othmer Encyclopedia of Chemical Technology*. 3$^{rd}$ edition. John Wiley & Sons: New York, NY, 1983. 332–335. (Month Unknown).

Motyl, K. M. "Cleaning with Supercritical $CO_2$." *NASA Tech Briefs MFS-29611*. George C. Marshall Space Flight Center: Alabama. (Date Unknown).

Hort, E. V. et al. "Acetylene–Derived Chemicals." vol. 1 of *Kirk–Othmer Encyclopedia of Chemical Technology*. Fourth edition. John Wiley & Sons: New York, NY, 1991. 195–199. (Month Unknown).

Schwartz, J. "The Importance of Low Dynamic Surface Tension in Waterborne Coatings." *Journal of Coatings Technology*. (Sep. 1992).

Schwartz, J. "An Additives Approach to Defect Elimination in Thermoplastic Waterborne Industrial Maintenance Coatings." *Journal of Coatings Technology*. (Jan. 1995).

*Surfynol® 400 Series Surfactants*. Air Products and Chemicals, Inc., Trade Literature. Pub #120–9427 (Date Unknown).

Chemical Abstract No. 111:208459, 1988 (Month Unknown).

Chemical Abstract No. 117:51308, 1992 (Month Unknown).

Chemical Abstract No. 117:244772, 1992 (Month Unknown).

Page, et al. "Effect of Phase Behavior on Supercritical Fluid Chromatographic and Extraction Performance."In Kiran et al, *Supercritcal Fluids* (1994) p. 641.

Primary Examiner—Joseph L. Schofer
Assistant Examiner—Wu C. Cheng
Attorney, Agent, or Firm—Mark L. Rodgers

[57] ABSTRACT

Acetylenic alcohols and diols have been found which are soluble in liquid/supercritical $CO_2$ and exhibit surface active properties. These alcohols and diols act as surfactants by lowering the surface tension between $CO_2$ and mobile $CO_2$-phobic substances which are contacted with the $CO_2$.

10 Claims, No Drawings

SURFACTANTS FOR USE IN LIQUID/SUPERCRITICAL CO₂

BACKGROUND OF THE INVENTION

The present invention relates to the use of surfactants in applications using liquid/supercritical $CO_2$.

Liquid and supercritical $CO_2$ is receiving interest as a replacement for organic solvents, specifically halogenated hydrocarbons for environmental reasons. $CO_2$ offers low cost, non-flammable, non-toxic, environmentally acceptable properties of interest for a number of applications. These applications include $CO_2$ cleaning, $CO_2$ extraction, and $CO_2$ media for polymerization. As with water based systems, $CO_2$ systems would benefit from the addition of surface active agents. However, whereas surfactant technology is well developed for aqueous based systems, specifically water/oil type mixtures, surfactants for $CO_2$ applications is not well understood. Aqueous surfactants are generally not suitable for $CO_2$ based systems as they lack $CO_2$-philic properties and as such do not offer any significant benefit. Several $CO_2$-philic surfactant systems have been found. A fluorocarbon polymer (poly(1, 1-dihydroperfluorooctyl acrylate) has been shown to exhibit $CO_2$-philic properties and has been employed in the successful polymerization of poly(methyl methacrylate) to yield controlled particles (DeSimone et al, Science, 265, p. 356, Jul. 15, 1994). Siloxane based polymers and oligomers were also noted to have $CO_2$-philic properties and likewise could be employed as a surfactant (protective colloid stabilizer) for heterogeneous polymerization in $CO_2$ (DeSimone et al., U.S. Pat. No. 5,312,882). Hoefling et al. reviewed the design and synthesis of $CO_2$-soluble surfactants and chelating agents (Fluid Phase Equilibria, 83, 203–212, (1993)) and noted the following functional groups interact favorably with $CO_2$: dimethyl siloxane, hexafluoropropylene oxide, fluoroalkyl, tertiary amines, aliphatic ethers, and aliphatic esters. The solubility of fluoroether and silicone-based amphiphiles in $CO_2$ was noted and reverse micelle formation in $CO_2$ water/surfactant mixtures was also observed. Hoefling et al. further noted that many of the available surfactants (designed for water/oil) and chelating agents exhibit poor $CO_2$ solubility with siloxanes and fluoroethers having the best potential for solubility in supercritical $CO_2$.

Hoefling et al., J. Phys. Chem., 95, 7127 (1991) noted that alkyl-functionalized amphiphiles are not effective in producing microemulsions in $CO_2$ whereas with alkane supercritical fluids they are effective. They noted that fluorinated alkanes are much more effective in $CO_2$ than conventional alkanes for surfactants in $CO_1$/water systems. Fulton et al., U.S. Pat. No. 5,266,205, disclosed a method of separating a solute from a polar fluid by contacting the solution with a near critical or supercritical fluid and a surfactant. A reverse micelle is formed whereby the continuous phase is a supercritical fluid, and the discontinuous phase is the polar fluid (immiscible with the supercritical fluid) surrounded by surfactant. The solute is transferred to the micelle for removal.

Matson et al., U.S. Pat. No. 5,238,671 describe conducting chemical reactions in a reverse micelle or microemulsion system comprised of a polar fluid as a discontinuous phase, a continuous phase of a water insoluble fluid at near critical or supercritical conditions, and a surfactant. In the examples, supercritical propane, water, and sodium bis(2-ethyl hexyl) sulfosuccinate) comprised the continuous phase, the discontinuous phase, and the surfactant respectively.

The technology for water based surfactants is probably only a century in development, but in reality significant advances have been made in the past five decades. As such, there are a large number of surfactants developed which will be noted in the following discussion. Most of these surfactants are designed for hydrophilic/hydrophobic combinations, specifically oil/water. These surfactants have been detailed in various reviews including "Surfactants" by K. Kosswig in Ullman's Encyclopedia of Industrial Chemistry, Vol. A25, p. 747, edited by B. Elvers, S. Hawkins and W. Russey, VCH Verlagsgesellschaft mbH, Weinheim (Germany) 1994 and by A. Cahn and J. L. Lynn, Jr. in the Kirk-Othmer Encyclopedia of Chemical Technology, Vol. 22, 3rd Ed., p. 332, John Wiley & Sons, New York, 1983. These surfactants include carboxylated ethoxylates, alkyl benzene sulfonates, alkyl naphthalene sulfonates, alkene sulfonates, α-olefin sulfonates, sulfosuccinates, alkyl sulfates, alkyl phosphates, nonyl phenol ethoxylates, silicone based surfactants, fluorosurfactants, block copolymers of poly(propylene oxide) and poly(ethylene oxide), poly (vinyl alcohol), imidozoline derivatives, quaternary ammonium surfactants, amine oxides, alkyl amine ethoxylates, ethylene diamine alkoxylates, amphoteric surfactants containing both acidic and basic hydrophilic groups, imidazolinium derivatives, alkyl pyridinium halides, alkylbetaines, amidopropylbetaines, aliphatic and rosin amine ethoxylates, monoalkanolamine condensates, diethanolamine condensates, carboxylic amides, sorbitan fatty acid esters, anhydrosoribotol esters, ethoxylated natural oils, fats and waxes, glycerol esters, and the like. These surfactants are generally designed for water/oil systems. Some of the surfactants offer promise in $CO_2$/water systems, as has been discussed supra, specifically fluoroalkyl, fluoroether and siloxane based systems. However, the vast majority of these systems have limited to no utility in $CO_2$/water and even less utility in $CO_2$/oil systems. As such, improved surfactant systems for $CO_2$/water and $CO_2$/oil are desired for a multitude of applications where $CO_2$ offers promise for new and unique applications such as $CO_2$ cleaning, degreasing, $CO_2$ extraction, and $CO_2$ oil field utility.

A number of cleaning technologies for a wide variety of industries have been under change due to environmental concerns. Utility of chlorofluorinated hydrocarbons (Freons) for specialty cleaning operations (e.g. electronics) have been replaced or are being replaced by less efficient systems based on hydrocarbons or water based systems. Dry cleaning operations based on trichloroethylene, perchlorinated hydrocarbons etc. are under increasing environment pressure to move to new (yet unavailable) technologies. Supercritical $CO_2$ has been proposed for these operations but the present $CO_2$ cleaning technology lacks the necessary efficiency for rapid replacement. Iliff et al., U.S. Pat. No. 5,412,958 describe a dry cleaning system utilizing supercritical $CO_2$ as the cleaning fluid, while R. L. Maffei (U.S. Pat. No. 4,012, 194) discloses the use of liquid $CO_2$ as the solvent of choice for extraction and cleaning processes. Water is a universal solvent for cleaning, however, without proper surfactants water has very limited utility. Likewise, $CO_2$ without proper surfactants also lacks universal cleaning potential. Prior to the present invention, available $CO_2$ based surfactants have been limited.

K. M. Motyl, NASA Tech Briefs MFS-29611 - "Cleaning with Supercritical $CO_2$", discusses the use of supercritical $CO_2$ to replace halocarbon solvents typically employed for removal of contaminants from metal parts. Studies were reported on carbon-based contaminant removal from stainless steel samples. The use of supercritical fluids containing solvent to clean apparatus containing polymeric compounds was described by Hoy et al., U.S. Pat. No. 5,306,350. It was noted that surfactants, detergents, antifoaming agents and wetting agents could be added to the process they described. Whitlock et al., U.S. Pat. No. 4,806,171 described a cleaning process whereby liquid carbon dioxide was expanded into particles of carbon dioxide (solid) and directed toward a substrate. This method was noted to be useful for removal of fine contaminant particles from the substrate. However, this impingement method would only be applicable to select surfaces and have limited utility to a wide variety of articles including fabrics. Suitable surfactants for $CO_2$ cleaning operations able to handle the diverse number of cleaning environments are highly desired.

Harris et al. (U.S. Pat. No. 4,913,235) discussed increasing the viscosity of $CO_2$ by adding a polymer having a solubility parameter of 6.85 (cal/cc)$^{1/2}$ or less and a cosolvent for the $CO_2$ and polymer. These compositions were noted to be useful for enhanced oil recovery applications.

A series of acetylenic alcohol and acetylenic diols have been utilized as wetting agents, dispersants, defoamers, viscosity stabilizers, and non-ionic surfactants for various applications. These applications generally involve water/oil or water/inorganic combinations where surface activity is required. Specific applications where acetylenic alcohols and diols are employed include inks, emulsion polymerization pigment grinding aids, cleaning, agricultural chemicals, shampoo, metalworking fluids, adhesive paper coatings, pigment dispersion, latex dipping, drilling needs, coatings and the like. These applications have been discussed by J. Schwartz in Journal of Coatings Technology (Sep. 1992) and (Jan. 1995).

The preparation of acetylenic alcohols and diols has been discussed by E. V. Hort and P. Taylor in Kirk-Othmer: Encyclopedia of Chemical Technology, 4th edition, Vol. 1, pp. 195–231, John Wiley & Sons, New York, 1991. Examples of acetylenic alcohols of interest include: hexyn-3-ol, 3,6-dimethyl-1-heptyn-3-ol, 3-methyl-1-pentyn-3-ol, 4-ethyl-1-octyn-3-ol, 3,5 dimethyl-1-hexyn-3-ol, 3-methyl-1-butyn-3-ol and the like. Examples of acetylenic diols include 5-decyn-4, 7-diol, 2,5,8,11 -tetramehtyl-6-dodecyn-5, 8 diol; 3,6-dimethyl-4-octyn-3,6-diol, 5,10-diethyl-7-tetradecyn-6, 9-diol; 2,4,7,9-tetramethyl-5-decyn-4, 7-dio; 2,5-dimethyl-3-hexyn-2,5-diol and the like.

Acetylenic alcohols and diols have been reacted with ethylene oxide to tailor performance for many of the above noted applications as described in "Surfynol 400 Series Surfactants", Air Products & Chemicals trade literature, Pub. # 120-9427.

Chemical Abstract No. 117:244772 teaches the supercritical fluid capillary chromatography of 2-propyn-1-ol while Chemical Abstracts 117:51308 and 111:208459 use Surfynol 465 and 3-butyn-2-ol, respectively, for the same type of chromatography. Both Page, et al. "Effect of Phase Behavior on Supercritical Fluid Chromatographic and Extraction Performance," *Supercritical Fluids*, 1994, p 641, and Brunner, et al. "Scale Up of Supercritical Fluid Chromatography (SFC)," *Supercritical Fluids*, 1994, pp 653 and 654, teach the use of $CO_2$ in supercritical fluid chromatography.

BRIEF SUMMARY OF THE INVENTION

A family of surfactants have been identified which are soluble in liquid/supercritical $CO_2$ and have surface active properties. Specifically, they reduce the interfacial tension of hydrophile/$CO_2$ compositions and improve the uptake of water by $CO_2$. The general structure of these surfactants is represented by acetylenic alcohol A and acetylenic diol B:

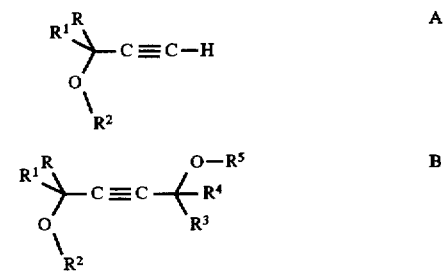

wherein R, $R^1$, $R^3$, $R^4$ are independently hydrogen atoms or linear or branched alkyl groups comprised of one to 34 carbons, and $R^2$ and $R^5$ are independently hydrogen atoms or hydroxyl terminated poly(alkylene oxide) chains derived from one to 20 alkylene oxide monomer units of the following structure:

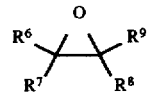

wherein $R^6$, $R^7$, $R^8$, and $R^9$ are independently hydrogen atoms, linear or branched alkyl groups from one to five carbons, or phenyl Acetylenic alcohol or diol/$CO_2$ compositions are contemplated to have utility in environmentally friendly cleaning operations, organic or inorganic extraction operations, and polymerization processes. Acetylenic alcohols and diols are also contemplated as wetting agents for $CO_2$ spray coating operations, defoamers for $CO_2$ based systems, and dispersing additives for inorganic compounds in $CO_2$. In essence, the acetylenic alcohol or diol/$CO_2$ compositions are contemplated for applications involving mobile $CO_2$-phobic materials where surface activity is desired.

DETAILED DESCRIPTION OF THE INVENTION

We have discovered acetylenic alcohols and diols which are soluble in liquid/supercritical $CO_2$ and exhibit surface active properties, i.e., act as surfactants. Specifically, they reduce the interfacial tension of hydrophile/$CO_2$ compositions and improve the uptake of water by $CO_2$.

These acetylenic alcohol and diol surfactants are prepared by reacting the appropriate ketone, such as acetone or methyl isobutyl ketone, with acetylene in the presence of a base catalyst. Acetylenic alcohols and diols containing pendant poly(alkylene oxide) chains are prepared by reacting ethylene oxide with the chosen acetylenic diol again using a base catalyst. The ethylene oxide concentration and ethoxylation reaction time are important parameters in controlling the extent of ethoxylation.

Suitable compositions contain from about 0.01 to 30 wt % acetylenic alcohol or diol in $CO_2$, preferably 0.1–15 wt % acetylenic alcohol or diol in $CO_2$.

The general molecular structures of surfactants of the present invention are given by acetylenic alcohol A and acetylenic diol B:

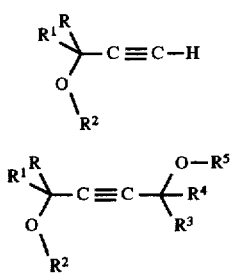

wherein R, $R^1$, $R^3$ and $R^4$ are independently hydrogen atoms or linear or branched alkyl groups comprised of one to 34 carbons, $R^2$ and $R^5$ are independently hydrogen atoms or hydroxyl terminated poly(alkylene oxide) chains derived from one to 20 alkylene oxide monomer units of the following structure:

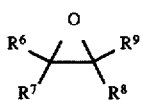

wherein $R^6$, $R^7$, $R^8$, $R^9$ are independently hydrogen atoms, linear or branched alkyl groups from one to five carbons.

Typical alkyl groups contained both in the acetylenic residue (i.e., R; $R^1$; $R^3$; $R^4$) and the poly(alkylene oxide) pendant chains (i.e., $R^6$; $R^7$; $R^8$; $R^9$) would include, for example, methyl, ethyl, propyl and isobutyl groups.

Select acetylenic alcohols and diols are sold by Air Products and Chemicals, Inc. under the Surfynol tradename. Specific examples of the acetylenic alcohols of interest include: hexyn-3-ol; 3,6-dimethyl-1-heptyn-3-ol; 3-methyl-1-pentyn-3-ol; 4-ethyl-1-octyn-3-ol; 3,5 dimethyl-1-hexyn-3-ol (Surfynol® 61), 3-methyl-1-butyn-3-ol and the like. Examples of acetylenic diols include 5-decyn-4, 7-diol; 2,5,8,11-tetramethyl-6-dodecyn-5, 8 diol; 3,6-dimethyl-4-octyn-3, 6-diol (Surfynol® 82); 5,10-diethyl-7-tetradecyn-6, 9-diol; 2,4,7,9-tetramethyl-5-decyn-4, 7-diol (Surfynol® 104); ethoxylated 2,4,7,9-tetramethyl-5-decyn-4, 7-diol (Surfynol® 400 series); propoxylated 2,4,7,9-tetramethyl-5-decyn-4, 7-diol; butoxylated 2,4,7,9-tetramethyl-5-decyn-4, 7-diol; 2,5-dimethyl-3-hexyn-2, 5 diol and the like.

The utility of the acetylenic diol or alcohol/$CO_2$ compositions includes, but is not restricted to, electronic cleaning operations such as silicon wafer cleaning, cleaning mechanical parts such as gyroscopes, dry cleaning of various fabrics, cleaning of equipment such as chemical reactors, cleaning of natural gas lines, cleaning of intricate parts where low viscosity and surfactant volatility is desired. The compositions are also contemplated for organic or inorganic extraction operations including environmental clean-up (soil extraction), food processes (fat/cholesterol), metal extraction and the like. It is also contemplated that acetylenic alcohols and diols can be employed in heterogeneous polymerization processes in $CO_2$, or as a cosurfactant with other $CO_2$-philic substances. These compounds might also be employed as wetting agents for $CO_2$ spray coating operations and defoamers for $CO_2$ based systems. They are also contemplated as dispersing additives for inorganic compound dispersion in $CO_2$.

The present invention claims the use of acetylenic diols in processes which utilize the surface active nature of acetylenic diols to lower the surface tension of $CO_2$-phobic materials which are mobile and can be removed from a substrate using the appropriate $CO_2$/acetylenic diol mixture. The present process which employs mobile $CO_2$-phobic materials are totally distinct from the prior art supercirital $CO_2$ chromatography described in the background. Chromatography is a process that purifies a compound by passing a mixture through either a packed column or (in the case of capillary chromatography) passes the mixture over a film. In both these cases, the mixture is purified by the components of the mixture interacting to different extents with the stationary phase as the mixture passes through the chromatographic process. The stationary phase is the film in the capillary or packing within the column. In chromatographic applications, the $CO_2$-phobic entity is the STATIONARY phase, wherein the present invention involves non-chromatographic processes wherein the $CO_2$-phobic material is mobile.

As both hydrophobic and hydrophilic units are on the acetylenic alcohols and diols and these structures exhibit high solubility in $CO_2$ and surface activity, these materials offer surfactant utility for $CO_2$ based systems containing a wide variety of $CO_2$-phobic materials. $CO_2$-phobic materials in the broadest sense would comprise those compounds with limited solubility in $CO_2$ (e.g., <5 wt. %). $CO_2$-phobic materials include most higher molecular weight compounds (e.g., >1000 Mw) such as hydrocarbon polymers (e.g., polyethylene, polypropylene, polystyrene), polyamides, polyesters, polyacrylates, vinyl ester containing polymers, aromatic polymers (e.g., polycarbonates, polysulfones, and polyimides), hydrophilic polymers (e.g., poly(acrylic acid), and the like. Poly(ethylene oxide) is a specific example of a hydrophilic polymer (soluble in water) which also exhibits hydrophobic properties (soluble in benzene).

However, poly(ethylene oxide) is not soluble in $CO_2$ (thus $CO_2$-phobic) and is a good model to assess the surfactant characteristics of the acetylenic alcohols and diols in a $CO_2$ medium. Other $CO_2$-phobic materials include naturally occurring materials such as proteins, enzymes, cellulosic products, inorganic salts, water, and water based systems, higher molecular weight oils and greases.

Acetylenic alcohols and diols are contemplated in all aforementioned applications utilizing $CO_2$, $CO_2$/water mixtures, $CO_2$/oil mixtures and $CO_2$/water/oil mixtures. In the $CO_2$/water mixtures or $CO_2$/water/oil mixtures, additional surfactants typically employed for water/oil surfactancy can be included in the overall composition.

The following examples are presented to better illustrate the present invention and are not meant to be limiting.

Experimental

In the following examples, mixtures of acetylenic alcohols or diols and $CO_2$ were prepared by adding the acetylenic alcohol or diol to a stainless steel variable volume view cell equipped with suitable relief devices, high pressure valves $CO_2$ inlet and outlet and a sapphire window at one end. A high pressure syringe pump (High Pressure Products, HIP pump) was filled with liquid $CO_2$ and used to quantitatively add $CO_2$ to the pressure vessel. The pressure vessel contained a magnetic stirrer and was stirred via a magnetic couple to a magnet located below the vessel. A description of the vessel is given in The Journal of Physical Chemistry 94, pp6021, 1990.

Example 1

Solubility of 3,5-Dimethyl-1-hexyn-3-ol in $CO_2$

The solubility of 3,5-dimethyl-1-hexyn-3-ol in $CO_2$ was measured using a volume view cell as described above. A weighed amount of surfactant (0.5–10 weight %) was placed inside the cell chamber in front of the piston. The cell window was attached and 10 cc's of $CO_2$, was added to the cell. The surfactant was mixed in the $CO_2$ using a magnetic stirring bar. The cell was mounted in horizontally and then immersed in a water bath. After allowing the high pressure cell to attain thermal equilibrium the pressure within the cell was varied using a floating piston. The pressure was changed to monitor the cloud point as being indicative of insolubility. The operator viewed the floating piston through the sapphire window using a suitable optic device, the onset of insolubility was taken when the translucent solution changed to an orange/brown color due to the Tindall light scattering of the insoluble droplets. The onset of insolubility was checked several times by varying the pressure using the high pressure syringe pump.

A water bath was used to vary the temperature for each concentration. On completing the solubility studies at one concentration and one temperature series, a calibrated injector loop attached to the high pressure cell was filled with the surfactant via a syringe. Utilizing a six way valve to help inject this fixed amount of surfactant, the surfactant concentration within the high pressure cell was increased by a fixed increment. The solubility studies for this new $CO_2$/surfactant concentration were measured at various temperatures in a similar manner to that previously described.

Table 1 summarizes the pressures at several different temperatures which describe the surfactant solubility limits for various surfactant/$CO_2$ concentrations. The solubility levels of 10.2% by weight to $CO_2$ for 3,5-dimethyl-1-hexyn-3-ol illustrate the excellent affinity that this surfactant has for $CO_2$.

TABLE 1

| Surfactant Concn. in $CO_2$ | Pressure Describing Cloud Point Determinations For Surfactant/$CO_2$ Concentrations Temperature | | |
|---|---|---|---|
| (wt %) | 35° C. | 45° C. | 55° C. |
| 0.50 | 1480 | 1800 | 2200 |
| 1.50 | 1530 | 1900 | 2260 |
| 2.50 | 1500 | 1860 | 2210 |
| 5.00 | 1380 | 1770 | 2120 |
| 7.60 | 1280 | 1680 | 2030 |
| 10.20 | 1200 | 1590 | 1950 |

Example 2
Solubility of 2,4,7,9-Tetramethyl-5-decyn-4,7-diol in $CO_2$

Solubility studies were performed as described in Example 1 using 2,4,7,9-tetramethyl-5-decyn-4,7-diol at 10% by weight to $CO_2$. Phase transitions were observed at the following conditions, 25° C. and 980 psi, 35° C. and 1280 psi, 45° C. and 1590, 55° C. and 1880 psi. The unexpectedly high degree of solubility of 2,4,7,9-tetramethyl-5-decyn-4,7-diol in $CO_2$, is attributed to the acetylenic moiety in the surfactant.

Example 3
Solubility of Ethoxylated 2,4,7,9-Tetramethyl-5-decyn-4,7-diol in $CO_2$ Solubility studies were performed as described in Example 1 for various ethoxylates of 2,4,7,9-tetramethyl-5-decyn-4,7-diol. Table 2 gives the complete set of pressures observed for the solubility limits at various concentrations and different temperatures for ethoxylates of 2,4,7,9-tetramethyl-5-decyn-4,7-diol containing 20, 40, 65, and 85 wt % ethylene oxide. The data show that for ethoxylates containing 20 and 40 wt % ethylene oxide, the surfactant has unexpectedly high $CO_2$ affinity (note that up to 4 wt % surfactant is soluble in $CO_2$), despite the hydrophilicity imparted by the ethylene oxide units. For ethoxylates containing 65 and 85 wt % ethylene oxide, the surfactant has poor $CO_2$ solubility.

TABLE 2

| wt % EO in surfactant | Surfactant Concn. In $CO_2$ (wt %) | Pressure Describing Cloud Point Determinations For Surfactant/$CO_2$ Concentrations Temperature | | | | |
|---|---|---|---|---|---|---|
| | | 25° C. | 35° C. | 45° C. | 60° C. | 65° C. |
| 20 | 1.3646 | 1410 | 2040 | 2420 | 3060 | 3200 |
| | 2.6028 | 2180 | 2710 | 3320 | 4040 | 4330 |
| | 3.2104 | 2450 | 2990 | 3320 | 3950 | 4330 |
| | 3.8330 | 1870 | 2350 | 2860 | 3500 | 3770 |
| 40 | 0.6159 | 1200 | | 1750 | 2390 | 2490 |
| | 1.2484 | 1840 | | 2610 | 3170 | 3320 |
| | 1.8749 | 2360 | | 3280 | 3640 | 3740 |
| | 2.8386 | 2580 | | 3490 | 4300 | 4510 |
| | 4.0446 | 2700 | | 3740 | 4440 | 4670 |
| 65 | 0.2486 | 1440 | 1920 | 2200 | 2690 | 2800 |
| | 0.8867 | 3570 | 4020 | 4590 | 5270 | 5470 |
| 85 | 0.2737 | 2350 | | 3420 | | |

Example 4
Interfacial Tension of Ethoxylated 2,4,7,9-Tetramethyl-5-decyn-4,7-diol in PEG/$CO_2$ For a molecule to be classified as a 'surfactant', i.e. a surface active agent, the compound should exhibit a degree of interfacial activity. Interfacial activity can be monitored using the 'pendant drop' technique, ("Chemistry of Interfaces" M. J. Jaycock & Parfitt, John Wiley and Sons, New York p49–51). This method is utilized to measure the interfacial tension between a pendant drop and a continuous phase that surrounds the drop. When carbon dioxide is used as the continuous media, special high pressure equipment with sapphire view ports is required to maintain a solution of $CO_2$ and surfactant, and to study the change in shape of the pendant drop for interfacial tension calculations. A general procedure for these high pressure phase behavior measurements may be found in Langmuir, vol. 10 1994, pg 3536–3541, by K. Harrison, K. P. Johnston, J. Goveas and E. A. O'Rear.

Various ethoxylates of 2,4,7,9-tetramethyl-5-decyn-4,7-diol were used in the interfacial tension study. Table 3 gives the interfacial tension observed for ethoxylates of 2,4,7,9-tetramethyl-5-decyn-4,7-diol containing 20, 40, and 65 wt % ethylene oxide. The table also gives the interfacial tension of the polyethyleneglycol (PEG 600)drop within the pure $CO_2$ media. The compound Surfynol 485, which comprises 85% ethylene glycol was found to be too insoluble at appreciable quantities to be used in the studies. This suggests that the desired weight % ethoxylation is 20–65 weight % The data show that each surfactant lowers interfacial tension when compared with the control having no surfactant. It is interesting to note the actual reduction in interfacial tension. For a control PEG 600 drop at 2510 psi the interfacial tension was measured to be 3.39 dyne/cm (run #5 in Table 3). At a comparable pressure of 2501 psi a surfactant/$CO_2$ solution of 2 weight % (using the 20 wt % ethoxylated Surfynol surfactant) was found to lower the interfacial tension of the PEG drop to 2.85 dyne/cm (run #27 in Table 3). This corresponds to lowering the interfacial tension by 0.54 dyne/cm, a 16% reduction. A surfactant/$CO_2$ solution of 2 weight % (using the 40 wt % ethoxylated Surfynol surfactant) gave an interfacial tension of 1.57 dyne/cm, at a $CO_2$ pressure of 4030 psi (run #33 in Table 3). The corresponding PEG drop at 4093psi used as the control gave an interfacial tension of 1.92 dyne/cm (run #18 in Table 3). This corresponds to an 18.2% reduction in interfacial tension. This data proves the interacial activity of Surfynol surfactants in $CO_2$ medium.

TABLE 3

Interfacial Tension Experiments via Pendant Drop Technique

IFT Experiment

| Run # | PEG (600) + $CO_2$/Surfactant | Experiment Pressure p (psi) | p (bar) | Interfacial Tension IFT (dyne/cm) |
|---|---|---|---|---|
| 1 | " | 2006 | 138 | 3.85 |
| 2 | " | 2122 | 146 | 4.10 |
| 3 | " | 2215 | 152 | 3.35 |
| 4 | " | 2421 | 167 | 3.89 |
| 5 | " | 2510 | 173 | 3.39 |
| 6 | " | 2595 | 178 | 3.19 |
| 7 | " | 2834 | 195 | 2.90 |
| 8 | " | 2943 | 203 | 2.79 |
| 9 | " | 2986 | 205 | 2.71 |
| 10 | " | 3053 | 210 | 2.66 |
| 11 | " | 3130 | 215 | 2.71 |
| 12 | " | 3188 | 219 | 2.60 |
| 13 | " | 3384 | 233 | 2.38 |
| 14 | " | 3474 | 239 | 2.27 |
| 15 | " | 3606 | 248 | 2.10 |
| 16 | " | 3681 | 2541 | 2.18 |
| 17 | " | 3957 | 273 | 1.81 |
| 18 | " | 4093 | 282 | 1.92 |
| 19 | " | 4117 | 284 | 1.81 |
| 20 | " | 4179 | 288 | 1.86 |
| 21 | " | 4333 | 299 | 1.71 |
| 22 | " | 4365 | 301 | 1.69 |
| 23 | " | 4389 | 303 | 1.72 |
| 24 | AP-420 | 1984 | 137 | 3.45 |
| 25 | AP-420 | 2140 | 148 | 3.05 |
| 26 | AP-420 | 2498 | 172 | 2.75 |
| 27 | AP-420 | 2501 | 173 | 2.85 |
| 28 | AP-420 | 3007 | 207 | 2.32 |
| 29 | AP-420 | 3574 | 246 | 1.83 |
| 30 | AP-440 | 3146 | 217 | 2.04 |
| 31 | AP-440 | 3522 | 243 | 1.96 |
| 32 | AP-440 | 3536 | 244 | 1.93 |
| 33 | AP-440 | 4030 | 278 | 1.57 |
| 34 | AP-440 | 4028 | 278 | 1.56 |
| 35 | AP-440 | 4568 | 315 | 1.38 |
| 36 | AP-440 | 4592 | 317 | 1.35 |
| 37 | AP-465 | 3599 | 248 | 1.95 |
| 38 | AP-465 | 3628 | 250 | 1.99 |
| 39 | AP-465 | 3995 | 276 | 1.73 |
| 40 | AP-465 | 3998 | 276 | 1.66 |
| 41 | AP-465 | 4508 | 311 | 1.57 |
| 42 | AP-465 | 4505 | 311 | 1.51 |

AP = 2 weight % Air Products Surfynol/$CO_2$ Solution
AP-420 = 20 weight % ethoxylated Surfynol 104 product
AP-440 = 40 weight % ethoxylated Surfynol 104 product
AP-465 = 65 weight % ethoxylated Surfynol 104 product

Example 5
Effect of Ethoxylated 2,4,7,9-Tetramethyl-5-decyn-4,7-diol on Water Uptake by $CO_2$ Utilizing the same phase behavior apparatus described in Example 1, a known amount of water was added through a sample loop to a surfactant $CO_2$ mixture of known phase behavior (i.e. its cloud point was first determined). Comparisons were made to water solubilization by pure $CO_2$ and compared to the pure surfactant phase behavior to study the effect the water addition had made, if any, on the measured cloud point for the system.

If the surfactant allowed for the uptake of water, the system would show a single phase at water loadings beyond that normally solubilized by $CO_2$. A cloud point could then be measured for the system, and compared to pure water and pure surfactant phase behavior in $CO_2$. If the surfactant did not aid in the uptake of water, a two phase system would be seen when loading water above that normally solubilized by pure $CO_2$.

Table 4 details results for ethoxylates of 2,4,7,9-tetramethyl-5-decyn-4,7-diol containing 20, 40 and 85 wt % ethylene oxide, respectively. The uptake of water and poly ethylene glycol is given at different temperatures and pressures. It can be seen that with the 20 wt % ethoxylate (at 0.751% by weight in $CO_2$), water uptake was 0.553% at 4010 psi and 65° C. Under these same conditions, the water solubility was 0.41 %. Thus, the ethoxylated 2,4,7,9-tetramethyl-5-decyn-4,7-diol increased the uptake of water into the $CO_2$ medium, thereby illustrating surfactant behavior.

Similarly, with the ethoxylate containing 85 wt % ethylene oxide (at 0.237% by weight in $CO_2$), water uptake was 0.826% at 5720 psi and 65° C. Water solubility under these pressure and temperature conditions was determined to be 0.45%. Thus, the ethoxylated 2,4,7,9-tetramethyl-5-decyn-4,7-diol again showed surfactant characteristics in the $CO_2$ medium.

TABLE 4

| Wt % EO in Surfactant | Wt % Surfactant in $CO_2$ | Condition | Wt % of water uptake | Wt % of PEG (MW = 600) uptake | water solubility in $CO_2$ | PEG solubility in $CO_2$ |
|---|---|---|---|---|---|---|
| 20 | 0.751 | 4500 psi 45° C. | 0.277% | | 0.26% | |
| | | 3110 psi 65° C. | 0.277% | | 0.39% | |
| | | 4010 psi 65° C. | 0.553% | | 0.41% | |
| 40 | 0.897% | 4040 psi 25° C. | | 1.091% | | 1.25% |
| | | 4550 psi 25° C. | | 1.360% | | 1.53% |
| | | 5220 psi 25° C. | | 1.627% | | 2.0% |
| 85 | 0.237% | 3980 psi 45° C. | 0.276% | | 0.27% | |
| | | 4400 psi 65° C. | 0.276% | | 0.42% | |
| | | 5400 psi 65° C. | 0.553% | | 0.44% | |
| | | 5720 psi 65° C. | 0.826% | | 0.45% | |

Example 6
2,4,7,9-Tetramethyl-5-decyn-4,7-diol as a Surfactant for Polymer Synthesis in $C_2$ A stainless steel reactor was pressure tested, purged with $CO_2$ the and pressure raised to ~810 psi @ 19° C. by the addition of 52.1 g of $CO_2$ (added via a ISCO syringe pump in the constant pressure mode set to 5200 psi). A solution containing methyl methacrylate monomer (Aldrich) ~50 g, , Vazo 67 azo initiator (duPont) 0.25 g, poly (dimethylsiloxanemonomethacrylate) 2.5 g and 2,4,7,9-tetramethyl-5-decyn-4,7-diol (0.5 g) was purged thoroughly with nitrogen and pumped into the reactor against the 810 psi pressure using a high pressure Thermal Separations feed pump. The pressure was further increased to 1990 psi @ 30° C. by adding 179.5 g $CO_2$ to the reactor using the ISCO high pressure syringe. The temperature was raised to the polymerization temperature of 65° C. This temperature increase created a further pressure increase to ~4000 psi. Pressure was monitored throughout the run, the reaction was left overnight and ran for 16 hours. The temperature was lowered at the end of the reaction to ambient conditions which lowered pressure back to ~800 psi. Pressure was completely reduced to zero psi by venting the carbon dioxide. The polymer powder recovered from the reactor was studied by G.P.C. and gave number average molecular weights ~200000 g/mole. The recovered yield was measured at 83.2.

Having thus described the present invention, what is now deemed appropriate for Letters Patent is set out in the following appended claims.

We claim:

1. In a process which involves contacting liquid or supercritical $CO_2$ with a mobile $CO_2$-phobic substance, the improvement of which comprises lowering the surface tension between said $CO_2$ and $CO_2$-phobic substance by adding to the $CO_2$ an acetylenic alcohol or diol surfactant represented by the structural formulae:

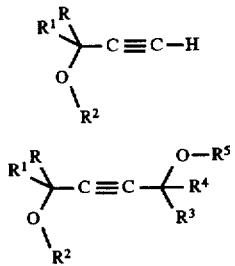

wherein R, $R^1$, $R^3$, $R^4$ are independently hydrogen atoms or linear or branched alkyl groups comprised of one to 34 carbons, and $R^2$ and $R^5$ are independently hydrogen atoms or hydroxyl terminated poly(alkylene oxide) chains derived from one to 20 alkylene oxide monomer units of the following structure:

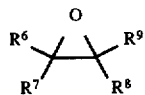

wherein $R^6$, $R^7$, $R^8$, and $R^9$ are independently hydrogen atoms, linear or branched alkyl groups from one to five carbons, or phenyl.

2. The process in accordance with claim 1 wherein said surfactant is added to the $CO_2$ in an amount from 0.01 to 30 wt % based upon the combined weight of $CO_2$ and surfactant.

3. The process in accordance with claim 1 wherein R, $R^1$, $R^3$ and $R^4$ are each independently methyl, ethyl, propyl or butyl groups.

4. The process in accordance with claim 1 wherein $R^6$, $R^7$, $R^8$ and $R^9$ are each independently methyl, ethyl, propyl or butyl groups.

5. The process in accordance with claim 1 wherein the process is an electronic cleaning operation.

6. The process in accordance with claim 1 wherein the process is a dry cleaning operation.

7. The process in accordance with claim 1 wherein the process is a $CO_2$ spray coating operation.

8. The process in accordance with claim 1 wherein the process is a heterogeneous polymerization process.

9. The process in accordance with claim 1 wherein the process is an extraction process.

10. The process in accordance with claim 1 wherein said $CO_2$ contains water in a concentration sufficient to yield a separate phase.

* * * * *